United States Patent
Fuerst et al.

(10) Patent No.: US 8,891,965 B2
(45) Date of Patent: Nov. 18, 2014

(54) METHOD FOR AUTOMATIC CONFIGURATION OF AN OPTICAL NETWORK ELEMENT

(75) Inventors: Cornelius Fuerst, Fuerstenfeldbruck (DE); Joerg-Peter Elbers, Fuerstenfeldbruck (DE); Andreas Faerbert, Munich (DE)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 383 days.

(21) Appl. No.: 13/325,379

(22) Filed: Dec. 14, 2011

(65) Prior Publication Data

US 2012/0328239 A1 Dec. 27, 2012

(30) Foreign Application Priority Data

Dec. 23, 2010 (EP) .................................... 10196855

(51) Int. Cl.
*H04J 14/02* (2006.01)

(52) U.S. Cl.
CPC ......... *H04J 14/0227* (2013.01); *H04J 14/0258* (2013.01); *H04J 14/0221* (2013.01); *H04J 14/0205* (2013.01); *H04J 14/0269* (2013.01); *H04J 14/0212* (2013.01); *H04J 14/0276* (2013.01); *H04J 14/0217* (2013.01)
USPC .......................................................... 398/49

(58) Field of Classification Search
USPC .................................... 398/48–57
See application file for complete search history.

(56) References Cited

U.S. PATENT DOCUMENTS

| | | | |
|---|---|---|---|
| 6,559,984 B1 | 5/2003 | Lee et al. | |
| 7,167,611 B2 * | 1/2007 | Chaudhuri et al. | 385/17 |
| 7,995,919 B2 * | 8/2011 | Graves et al. | 398/45 |
| 8,229,300 B2 * | 7/2012 | Bogoni et al. | 398/45 |
| 2007/0116462 A1 * | 5/2007 | Peloso et al. | 398/45 |
| 2011/0188853 A1 * | 8/2011 | Schimpe | 398/38 |

FOREIGN PATENT DOCUMENTS

| | | |
|---|---|---|
| EP | 1 081 982 A2 | 3/2001 |
| EP | 1 879 308 A1 | 1/2008 |
| WO | WO 03/030413 A2 | 4/2003 |

* cited by examiner

*Primary Examiner* — Leslie Pascal
(74) *Attorney, Agent, or Firm* — Erik G. Swenson; Fulbright & Jaworski L.L.P.

(57) ABSTRACT

A method for automatic confirmation of an optical network element optical modules each having multiple fibers; a fiber shuffle interconnector having ports to which said optical modules are connected; and a configuration unit which performs an automatic configuration of said optical network element by controlling all optical modules connected to said fiber shuffle interconnector to transmit a fiber identifier associated with a fiber of the respective optical module to the respective port of said fiber shuffle interconnector to which said optical module is connected, wherein said fiber shuffle interconnector forwards the received fiber identifier via another port of said fiber shuffle interconnector to another optical module of said optical network element which detects said forwarded fiber identifier being monitored by said configuration unit to generate a connectivity matrix indicating the connection of said optical modules to said fiber shuffle interconnector on the basis of the detected fiber identifiers.

16 Claims, 8 Drawing Sheets

METHOD FOR AUTOMATIC CONFIGURATION OF AN OPTICAL NETWORK ELEMENT

CROSS-REFERENCE TO RELATED APPLICATIONS

This application claims the benefit of European Patent Application No. EP 10196855.0, filed Dec. 23, 2010, the entire disclosure of which is herein incorporated by reference.

BACKGROUND OF THE INVENTION

The invention relates to a method for performing an automatic configuration of an optical network element comprising optical modules each having multiple fibres and in particular to performing an automatic configuration of dense wavelength division multiplexing (DWDM) switch modules and autonomous fibre map configuration.

Conventional DWDM switch nodes in optical networks typically comprise a number of different cards which are interconnected by optical patch cards, i.e. single or multi fibre cables. Due to the high number of involved cards and the high number of cables that need to be installed a setup can become quite complicated. Consequently because of the many necessary cabling instructions a faulty cabling might be provided because of human errors. A card and node commissioning requires a knowledge of the fibre map because each port connection is specific. In conventional DWDM switch nodes logical connections are individually commissioned by hand according to a preplanned fibre map. This manual connection takes time and can create errors for a first installation and each upgrade.

Accordingly, it is an object of the present invention to provide an optical network element which allows an automatic configuration.

BRIEF SUMMARY OF THE INVENTION

The invention provides an optical network element comprising:
  optical modules each having multiple fibres;
  a fibre shuffle interconnector having ports to which said optical modules are connected; and
  a configuration unit which performs an automatic configuration of said optical network element by controlling all optical modules connected to said fibre shuffle interconnector to transmit a fibre identifier associated with a fibre of the respective optical module to the respective port of said fibre shuffle interconnector to which said optical module is connected, wherein said fibre shuffle interconnector forwards the received fibre identifier via another port of said fibre shuffle interconnector to another optical module of said optical network element which detects said forwarded fibre identifier being monitored by said configuration unit to generate a connectivity matrix indicating the connection of said optical modules to said fibre shuffle interconnector on the basis of all detected fibre identifiers.

An advantage of the optical network element according to the present invention resides in that the configuration is performed automatically and does not require any manual cabling. Consequently a faulty cabling caused by human errors is avoided. Another advantage is to allow free selection among equivalent ports.

Another advantage of the optical network element according to the present invention is that the employed automatic configuration is performed much faster than the conventional manual configuration.

The installation and commissioning of the optical network element according to the present invention is simplified and accelerated. The optical network element according to the present invention provides an automatic configuration and commissioning by performing an automatic detection of a connectivity matrix.

In a possible embodiment of the optical network element according to the present invention the configuration unit comprises a control unit which controls the optical modules to transmit at least one fibre identifier associated with a fibre of the respective optical module.

In a further possible embodiment of the optical network element according to the present invention the configuration unit further comprises a monitoring unit which monitores fibre identifiers detected by said optical modules.

In a still further possible embodiment the configuration unit further comprises a memory unit for storing the generated connectivity matrix of the optical network element.

In a possible embodiment of the optical network element according to the present invention the fibre identifier comprises an optical pilot signal.

In a further possible embodiment of the optical network element according to the present invention the fibre identifier comprises an optical encoded signal.

In a further possible embodiment of the optical network element according to the present invention the optical modules comprise for each transmitting fibre means for providing a fibre identifier and for each receiving fibre means for detecting a fibre identifier.

In a possible embodiment of the optical network element according to the present invention the optical module comprises a switch module having an interface for connecting the fibres of said switch module to a port of said fibre shuffle interconnector via a multifibre cable and transponder interfaces for connecting traffic modules such as transponders to said switch module. The traffic module can be formed as a network interface of a device such as a transponder, router, switch, etc.

In a further possible embodiment of the optical network element according to the present invention the optical module comprises a fan-out-module having an interface for connecting the fibres of said fan-out-module to a port of said fibre shuffle interconnector via one or more multifibre cables and an inline interface for connecting the fan-out-module to an optical network interface of a line switch.

In a possible embodiment of the optical network element according to the present invention the fan-out-module comprises at least one wavelength selective switch connected to transmitting fibres and/or at least one coupler connected to receiving fibres of said fan-out-module.

In a further possible embodiment of the optical network element according to the present invention the ports of said fibre shuffle interconnector are connected to said optical modules by means of multifibre cables comprising MPO cables and MTP cables.

In a possible embodiment of the optical network element according to the present invention an open port of the fibre shuffle interconnector being not connected to an optical module is terminated by a multifibre loopback connector to measure loopback losses.

In a possible embodiment of the optical network element according to the present invention the optical modules comprise for each fibre signal generator means for generating an optical signal having a predetermined signal power for the respective fibre and signal measuring means for measuring automatically through losses and loopback losses.

The invention further provides an add-drop-multiplexing device for an optical network comprising at least one flexible add/drop optical network element comprising:
  optical modules each having multiple fibres;
    a fibre shuffle interconnector having ports to which said optical modules are connected; and
    a configuration unit which performs an automatic configuration of said optical network element by controlling all optical modules connected to said fibre shuffle interconnector to transmit a fibre identifier associated with a fibre of the respective optical module to the respective port of said fibre shuffle interconnector to which said optical module is connected, wherein said fibre shuffle interconnector forwards the received fibre identifier via another port of said fibre shuffle interconnector to another optical module of said optical network element which detects said forwarded fibre identifier being monitored by said configuration unit to generate a connectivity matrix indicating the connection of said optical modules to said fibre shuffle interconnector on the basis of all detected fibre identifiers.

The fibre shuffle interconnector is a passive fibre shuffle interconnector and does neither generate nor detect fibre identifiers.

The invention further provides a method for automatic configuration of an optical network element comprising optical modules each having multiple fibres, said optical modules being connected by means of at least one fibre shuffle interconnector,
wherein said method comprises the steps of:
(a) transmitting for all provided optical modules of said optical network element a fibre identifier associated with a fibre of the respective optical module to a port of said fibre shuffle interconnector which forwards the received fibre identifier via another port to another optical module of said optical network element which detects said forwarded fibre identifier; and
(b) generating a connectivity matrix indicating the connection of said optical modules to said fibre shuffle interconnector on the basis of all detected fibre identifier.

In a possible embodiment of the method according to the present invention the method is performed during an installation of said optical network element.

In an alternative embodiment of the method according to the present invention the method is performed during an operation of said optical network element.

In a possible embodiment of the method according to the present invention said fibre identifier comprises an optical pilot signal.

In a further possible embodiment of the method according to the present invention said fibre identifier comprises a specific encoded optical signal.

BRIEF DESCRIPTION OF THE DRAWINGS

In the following possible embodiments of an optical network element and a method for automatic configuration of such an optical network element are described with reference to the enclosed figures.

DETAILED DESCRIPTION OF THE INVENTION

Figure 1:
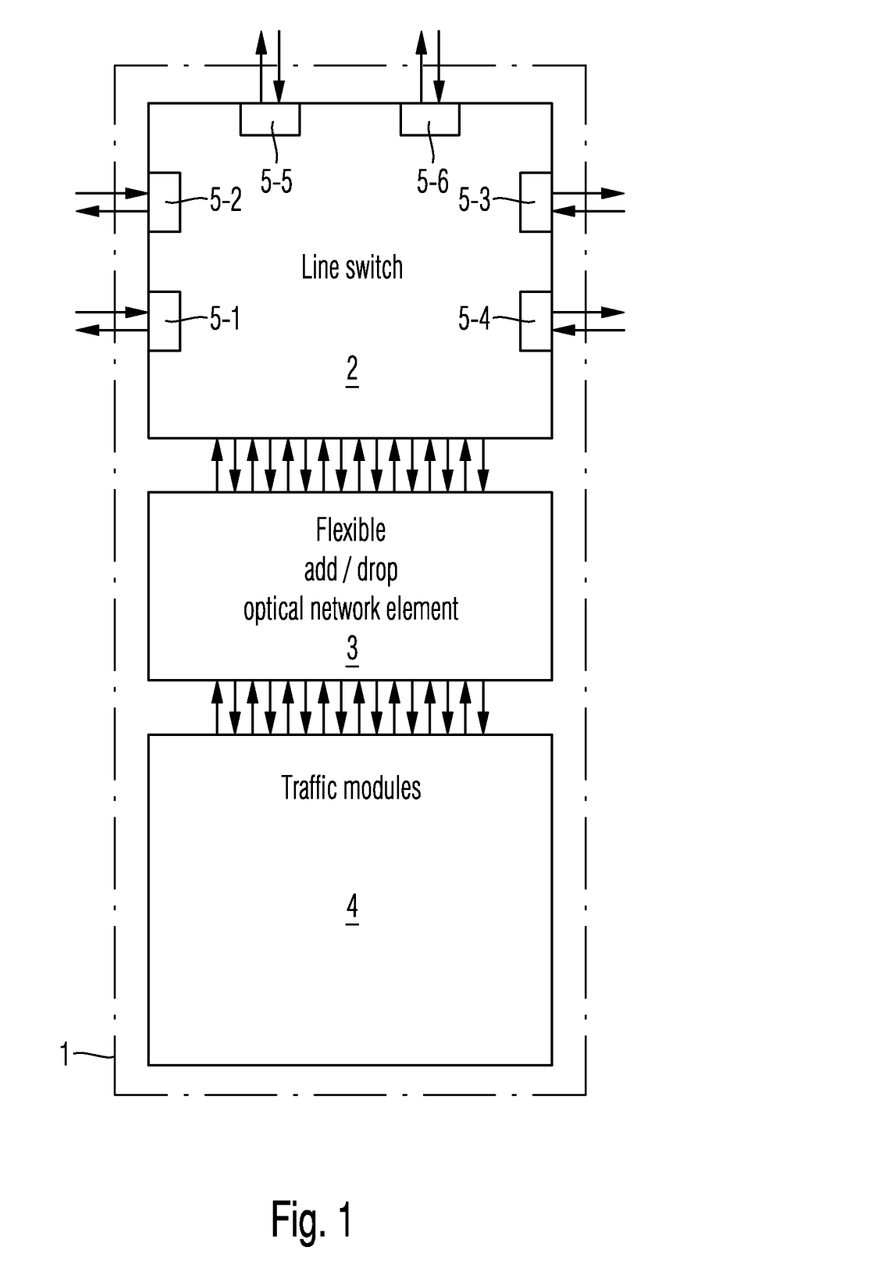
FIG. 1 shows a block diagram of an apparatus comprising an optical network element according to a possible embodiment of the present invention.

As can be seen in FIG. 1 an apparatus 1 can form part of an optical network having a line interface 2 for performing optical switching between different optical networks and a local add/drop optical network element 3. The apparatus 1 shown in FIG. 1 can form a DWDM switch node of an optical network. The optical network element 3 is in the shown embodiment a flexible add/drop optical network element connecting the line switch 2 via interfaces to traffic modules 4 such as transponders and/or muxponders 4. In a possible embodiment the line switch 2 can be based on WSS (wavelength selected switch) technology. The flexible and modular add/drop optical network element 3 is connected to the line switch 2 as shown in FIG. 1. The line switch 2 comprises several network interfaces. In the shown exemplary embodiment the line switch 3 comprises D network interfaces 5-1, 5-2, 5-3, 5-4, 5-5, 5-6 connecting said apparatus 1 to D different optical networks, wherein D is the degree of the apparatus 1 forming an optical network node. In the shown exemplary embodiment the degree D is six (D=6). The optical network interfaces 5-i are bidirectional to transmit and receive optical signals. The line switch 2 allows for switching of a wavelength from any to any line port, e.g. east to west, or towards the local add/drop optical network element 3.

Figure 2:
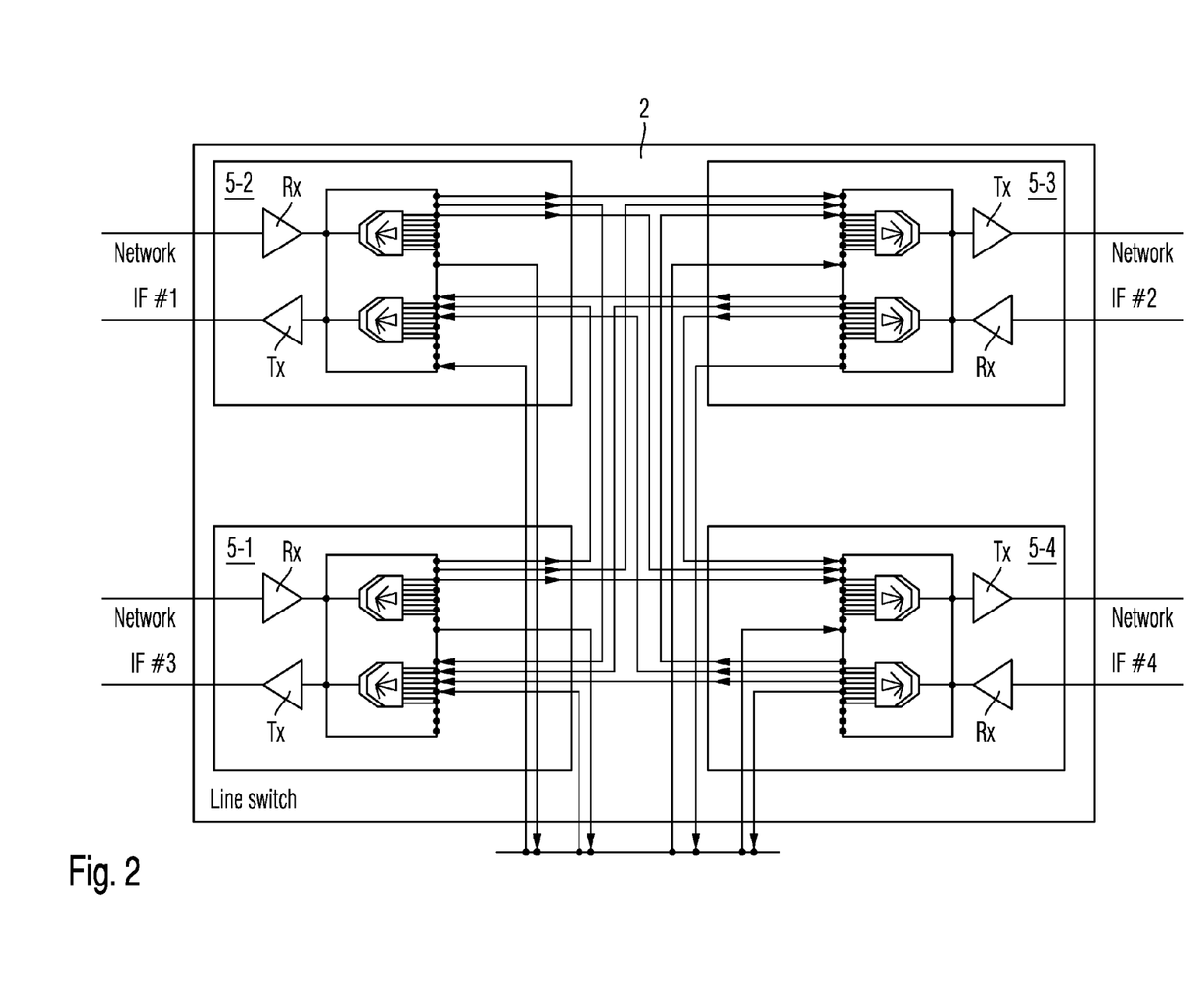
FIG. 2 shows a block diagram of a line switch within the apparatus shown in FIG. 1.

FIG. 2 shows a block diagram of a possible embodiment of a line switch 2 as employed by an apparatus 1 as shown in FIG. 1. In the shown exemplary embodiment the line switch 2 comprises four bidirectional network interfaces 5-1, 5-2, 5-3, 5-4. The line switch 2 is provided for performing optical switching. The line switch 2 can perform a switching of a wavelength λ, from any to any line port, in particular east to west or towards the local flexible add/drop optical network element 3. In the shown example each bidirectional optical network interface 5-i comprises a receiving amplifier RX for amplifying a received optical signal and a transmitting amplifier TX for amplifying a optical transmitted signal. Each bidirectional optical interface 5-i has in the shown exemplary embodiment a N×1 wavelength selective switch WSS including a splitter and a combiner or multiplexing unit, wherein N is an integer typical in the range of 4≤N≤20. The receiving amplifier RX comprises an output which is connected to the splitter of the wavelength selective switch WSS and the transmitting amplifier TX has an input which is connected to the output of the signal combiner or multiplexing unit.

In a possible implementation each receiving amplifier RX receiving an optical signal from an associated optical network is controlled by a control signal. Depending on the control signal the RX amplifiers can be modulated at a predetermined frequency to provide an optical pilot signal or to provide an optical encoded signal which can be used as an identifier or label. In a possible embodiment each label is unique to the line direction to which it is attached. For example an optical signal having the line direction "east" gets a label "1" whereas an optical signal having a line direction "west" gets an opposite label "0". In a possible embodiment the RX amplifier modulates an RF/code as associated to the line direction during a startup phase. The labelled signal is broadcasted by the splitter into all directions and detected by the multiplexing WSS modules on the individual WSS ports. A tap monitor can identify the RF/code on each WSS port during the auto startup phase or procedure. For example, if port 2 of a wavelength selective switch WSS receives a label "1" it can be determined that signals from an East interface (label "1") are received on wavelength selective switch (WSS) West port 2. According to this embodiment it is not necessary to specify in advance which direction a signal arriving at a port does have. If a direction label appears twice on the same WSS card then it can be determined that the cabling is wrong and a corresponding alarm signal can be generated.

The flexible add/drop optical network element 3 connected to the line switch 2 receives the same labels and can therefore automatically identify which input port is connected to which line direction (downstream). In upstream direction each port can provide in a possible embodiment a specific label which can be detected on the WSS ports. The add/drop ports of the flexible add/drop optical network element 3 use different labels as the line ports of the line switch 2. Accordingly, the system can easily distinguish between add/drop ports and line ports.

Figure 3:
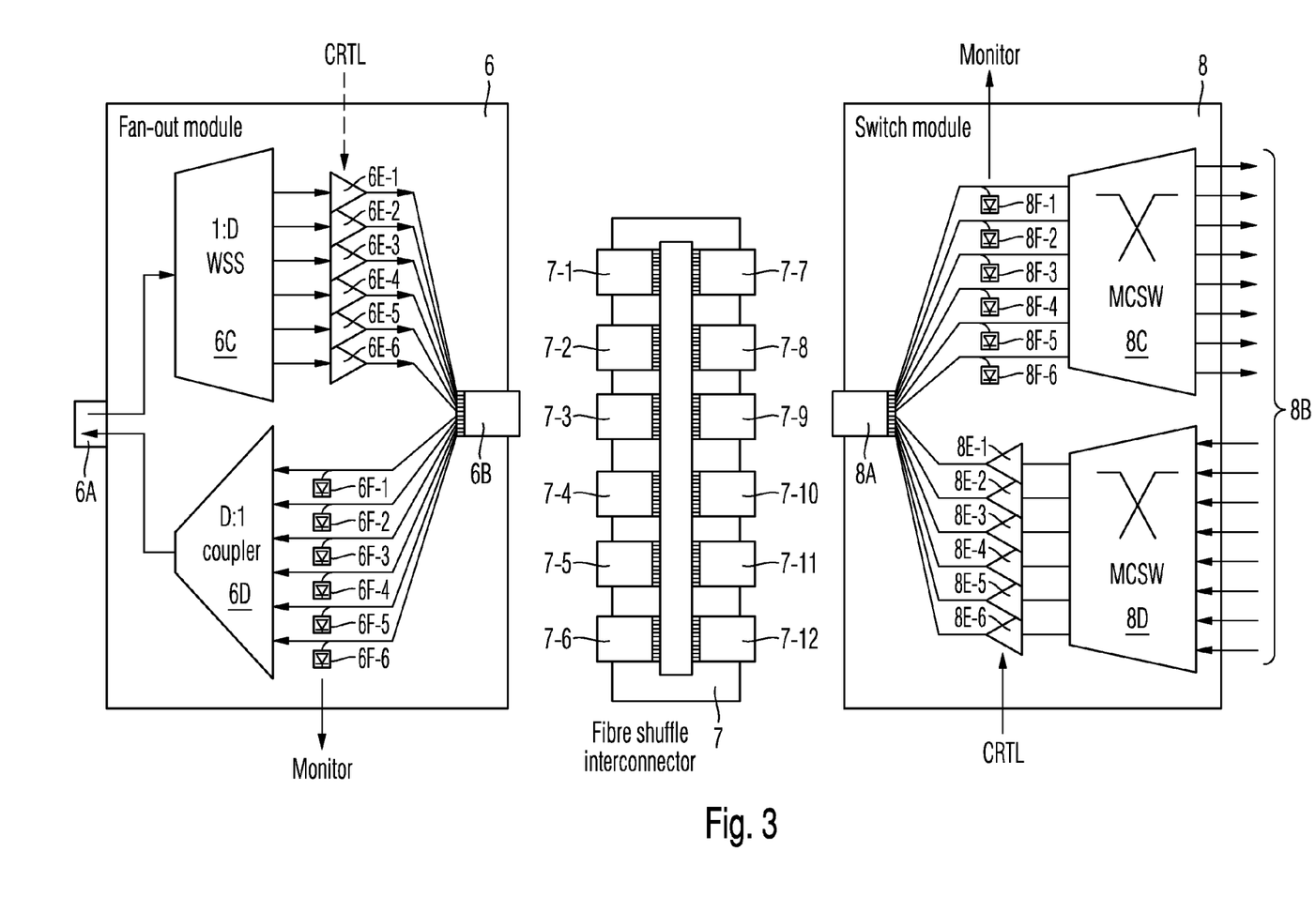
FIG. 3 shows possible components of an optical network element according to a possible embodiment.

FIG. 3 shows components for an optical network, node 1 having a degree D and T tributary ports. The shown components can be connected to each other to form a flexible optic network element 3 and can be used within an optical network node 1 as shown in FIG. 1. The three components shown in FIG. 3 are a fan-out-module 6, a shuffle interconnector 7 and a switch module 8. These components 6, 7, 8 can be connected to each other by means of multifibre cables for example by MPO cables having in the shown exemplary embodiment 2×D fibres. In the shown exemplary embodiment for a node degree D=6 the fibre shuffle interconnector 7 comprises 2×D=12 fibre MPO connectors for connecting several fan-out-modules 6 and several switch modules 8 to the fibre shuffle interconnector 7. The fibre shuffle interconnector 7 comprises in the shown exemplary embodiment 2×D=12 ports. These fibre shuffle interconnection ports comprise upstream ports for connecting the fibre shuffle interconnector 7 to fan-out-modules 6 and down-stream ports for connecting the fibre shuffle interconnector 7 to switch modules 8.

In the shown exemplary embodiment each fan-out-module 6 comprises a port or interface 6A for connecting the fan-out-module 6 in the upstream direction to the line switch 2 and a port or interface 6B, e.g. an MPO connector, for connecting the fan-out-module 6 in the downstream direction to an upstream port of the fibre shuffle interconnector 7. Accordingly, the fan-out-module 6 comprises the line interface 6A for connecting the fan-out-module 6 to an optical network interface of the line switch 2 and the interface 6B for connecting the fibres of the fan-out-module 6 to an upstream port of the fibre shuffle interconnector 7.

The fan-out-module 6 comprises in the shown exemplary embodiment a 1:D wavelength selective switch WSS 6C and a D:1 optical coupler 6D with the node degree being D=6 in the shown exemplary embodiment. The optical coupler 6D can be formed by a passive coupler. The fan-out module 6 can comprise any combination of WSS modules 6C and optical couplers 6D, e.g. two couplers, two WSS modules or one coupler and one WSS module, wherein the WSS module can be an upstream or a downstream module. The wavelength selective switch 6C can switch the received signal to D different optical fibres, wherein the node degree D=6 in the shown exemplary embodiment. For each optical fibre a corresponding element 6E-1, 6E-2, 6E-3, 6E-4, 6E-5, 6E-6 is provided for labelling the optical signal transmitted via the corresponding optical fibre. This optical label or fibre identifier can be formed in a possible embodiment by an optical pilot signal. In a further possible embodiment this optical label or fibre identifier can be formed by an optical encoded signal. In a possible embodiment the means for providing the signal label or fibre identifier can be formed by a signal amplifier being controlled by a control signal CRTL as shown in FIG. 3. In a possible embodiment the control signal CRTL controls a modulation of the optical signal transported via the corresponding optical fibre. In a possible embodiment this labelling or modulation is performed only during an installation of the optical network element such as the optical network element 3 shown in FIG. 1.

The fan-out-module 6 as shown in FIG. 3 comprises at the input side of the D:1 signal coupler 6B for each of the (D=6) receiving optical fibres means for detecting a fibre identifier or signal label 6F-1, 6F-2, 6F-3, 6F-4, 6F-5, 6F-6. These label or fibre identifier means can comprise a detector for detecting an optical pilot signal or a detector for detecting an optical encoded signal.

In a possible embodiment after the installation/commissioning is completed the generation of fibre identifiers or labels the label generation means 6E-1 to 6E-6 can be switched off to prevent a possible distortion of the running data traffic during normal operation and to reduce power consumption. Such distortions only occur for certain types of the fibre identifiers. In a possible embodiment after installation/commissioning is completed the label detection means 6F-1 to 6F-6 for detecting a fibre identifier or label, are also de-activated to prevent a distorsion of the running data traffic and to reduce consumption and power.

In a further possible embodiment fibre identifiers or signal labels are maintained also during normal operation to provide an in-service surveillance of the connections.

The fibre identifiers detected by the fan-out-module 6 are supplied by means of a monitor signal to a configuration unit. In a possible embodiment the configuration unit also controls the label generation means 6E-i generating the fibre identifiers. In the shown exemplary embodiment of FIG. 3 the fan-out-module 6 comprises six downstream fibres and six upstream fibres corresponding to a node degree D=6 of the optical network node 1. The downstream fibres transport signals towards the traffic modules 4 whereas upstream fibres trans-port signals towards the line switch 2. The number of down-stream and upstream fibres can vary in different embodiments. In a possible embodiment the number of upstream fibres and the number of downstream fibres is equal as shown in the exemplary embodiment of FIG. 3. Also the total number of fibres can vary. In the exemplary embodiment of FIG. 3 the total number of fibres is six (D=6) optical fibres, i.e. six downstream optical fibres and six upstream optical fibres. In alternative embodiments the number of optical fibres provided for different directions e.g. for downstream optical fibres and for upstream optical fibres can vary. In a further alternative embodiment the number of optical fibres is more than six fibres for example eight downstream optical fibres and eight upstream optical fibres. Also bidirectional signal transmission via the same optical fibre having a label generation means and label directing means attached is possible as well.

Figure 4:
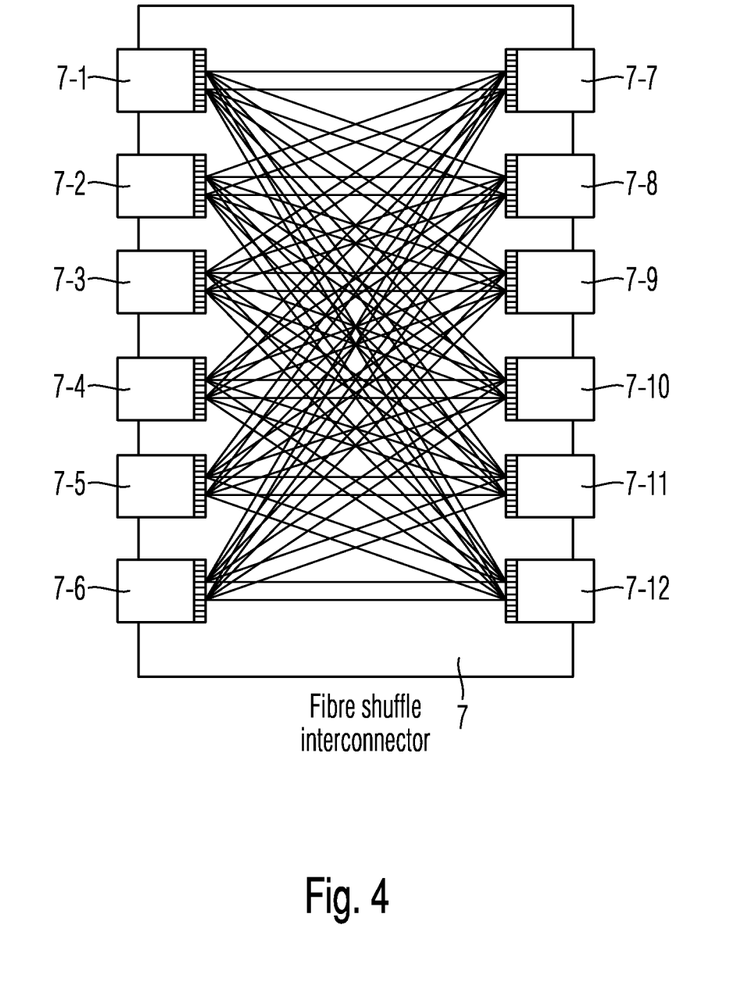
FIG. 4 shows an exemplary embodiment of a fibre shuffle interconnector as used in an optical network element according to a possible embodiment.

The number of optical fibres can correspond to the total number of ports 7-i of the fibre shuffle interconnector 7 as shown in FIG. 3. In the shown exemplary embodiment of FIG. 3 the fibre shuffle interconnector 7 comprises 2×D=12 ports for connecting optical modules such as fan-out-modules 6 and/or switch modules 8 to the fibre shuffle interconnector 7. The fibre shuffle interconnector 7 is in the shown embodiment a passive component and each port 7-i is connected or wired internally to any other port of the fibre shuffle interconnector 7. FIG. 4 shows an internal structure of a fibre shuffle interconnector 7 comprising twelve ports as shown in FIG. 3.

The switch module 8 as shown in FIG. 3 comprises an interface 8A for connecting the fibres of the switch module 8 to a port 7-i of the fibre shuffle interconnector 7. Furthermore, the switch module 8 comprises a transponder interface 8B for connecting transponders or muxponders 4 to the switch module 8. In the shown exemplary embodiment of FIG. 3 the switch module 8 comprises a downstream multicast switch 8C and an upstream multicast switch 8D. The output of the downstream multicast switch 8C and the input of the upstream multicast switch 8D from the transponder interface 8B for connecting transponders/muxponders 4 to the switch module 8. In the shown exemplary embodiment of FIG. 3 the downstream multicast switch 8C comprises T outputs for connecting up to T traffic modules 4 transponders/muxponders and the upstream multicast switch 8D also comprises T inputs for connecting up to T traffic modules 4 to the upstream multicast switch 8D, wherein T is the number of tributary ports. In the shown exemplary embodiment of FIG. 3 the number T of tributary port is eight (T=8). As can be seen from FIG. 3 the downstream multicast switch 8C receives D optical signals via D different optical fibres from the interface 8A connecting the switch module 8 to the fibre shaft interconnector 7, wherein D is the node degree being D=6 in the shown exemplary embodiment. Furthermore, in the shown embodiment the upstream multicast switch 8D comprises D optical fibres for transporting optical signals to the fibre shuffle interconnector 7. Each optical fibre comprises means for labelling the corresponding fibre or optical signal with a fibre identifier or label 8E-1, 8E-2, 8E-3, 8E-4, 8E-5, 8E-6. In a possible embodiment these means for providing a fibre identifier or label performed by optical amplifiers for generating an optical pilot signal or specific encoded optical signal to generate a fibre identifier or label in response to a control signal applied to the switch module from the configuration unit 9 shown in FIG. 5. It is possible to generate the same label on all ports 6E-i and another label which is the same for all 8E-i ports and still getting the full connectivity information.

As can be seen in FIG. 3 the downstream multicast switch 8C receives optical signals via D (D=6) different optical fibres from the multicable connector 8A connecting the switch module 8 to the fibre shuffle interconnector 7. For each optical fibre the corresponding detector 8F-1, 8F-2, 8F-3, 8F-4, 8F-5, 8F-6 provided for detecting a fibre identifier or label. These fibre identifier detecting means apply a monitor signal to the configuration unit 9 shown in FIG. 5.

Figure 5:
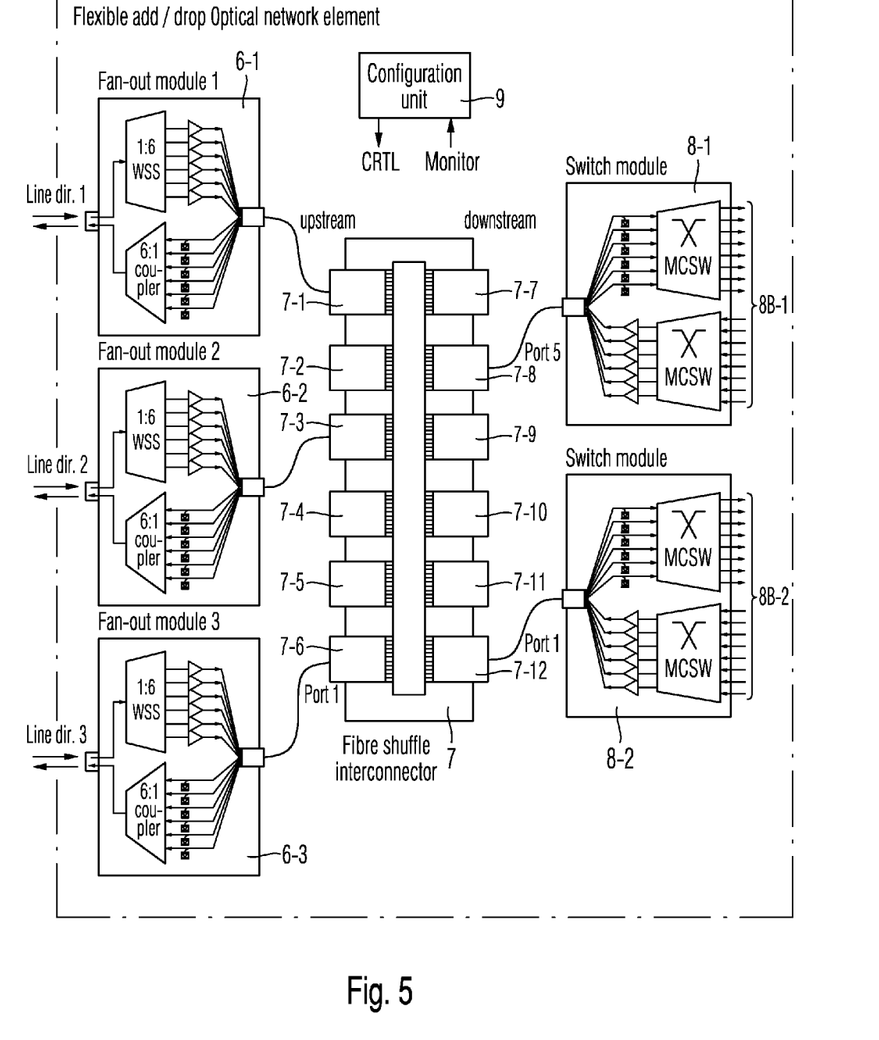
FIG. 5 shows an example illustrating an exemplary embodiment of an optical network element according to the present invention.

FIG. 5 shows an example for a flexible add/drop optical network element 3 as used within the network node 1 as shown in FIG. 1. This flexible add/drop optical network element 3 comprises in the shown exemplary embodiment a fibre shuffle interconnector 7 as shown in FIG. 3, 4. In the shown exemplary embodiment the fibre shuffle interconnector 7 comprises D (D=6) upstream ports 7-1 to 7-6 and (D=6) downstream ports 7-7 to 7-12. These three upstream ports 7-1, 7-3, 7-6 connected in the shown example to three fan-out-modules 6-1, 6-2, 6-3 and two downstream ports 7-8, 7-12 of the fibre shuffle interconnector 7 are connected to a switch module 8-1 and a switch module 8-2 respectively. The remaining ports of the fibre shuffle interconnector 7, i.e. upstream ports 7-2, 7-4, 7-5 as well as downstream ports 7-7, 7-9, 7-10, 7-11 are not occupied and not connected to any optical module in the shown example of FIG. 5.

In the example shown in FIG. 5 the fibre identifier generation means of fan-out-module 6-3 can modulate an RF/code associated to the line direction during a startup procedure or start phase. The transmitted RF/code can be the same for all ports of the fan-out-module 6 or card. For example the switch module 8-2 provides monitoring signals to identify an RF/code during the autostart procedure. For example if fan-out-module 6-3 of line direction interface 3 is connected to shuffle port 7-6 then a label 3 appears on all ports 7-7 to 7-12.

In a possible embodiment the same label is generated on all ports 6E-I and another label is generated which is the same for all ports 8E-i.

Furthermore, the fibre identifiers or label generators of switch module 8-2 can modulate RF/code associated to a commissioning sequence during the startup procedure and detectors of the fan-out-module 6-3 can identify the corresponding RF/code during the auto startup procedure. In the shown example switch module 8-1 is connected to shuffle port 7-8 of the fibre shuffle interconnector 7 so that a label 1 indicating switch module 8-1 generated by the corresponding label generators of the switch module 8-1 appears on shuffle port 7-8.

As can be seen in FIG. 5 in a possible embodiment the flexible add/drop optical network element 3 comprises a configuration unit 9. The configuration unit 9 generates control signals CRTL for controlling the fibre identifier or label generator means 6E-i of the fan-out-modules 6 and the fibre identifier or label generation means 8E-i of the switch modules 8-i.

Furthermore, the configuration unit 9 receives monitor signals from the fibre identifier or label identifiers 6F-i of the fan-out-modules 6 and 8F-i of the switch modules 8.

The configuration unit 9 performs an automatic configuration of the optical network element 3 by controlling the optical modules 6-i, 8-i connected to the fibre shuffle interconnector 7. The configuration unit 9 controls the optical modules 6, 8 to transmit a fibre identifier or label associated with the fibre of the respective optical module to the respective port of the fibre shuffle interconnector 7 to which that optical module is connected. The fibre shuffle interconnector 7 forwards the received fibre identifier or label via another port 7-i of the fibre shuffle interconnector 7 to another optical module of the optical network element 3. The optical module 3 receiving the forwarded signal comprising the fibre identifier or label detects the forwarded fibre identifier and provides a corresponding monitoring signal to the configuration unit 9. On the basis of the received monitored fibre identifiers or labels the configuration unit 9 generates automatically a connectivity matrix indicating the connection of the optical modules 6, 8 to the fibre shuffle interconnector 7 on the basis of all detected fibre identifiers or labels.

Figure 6:
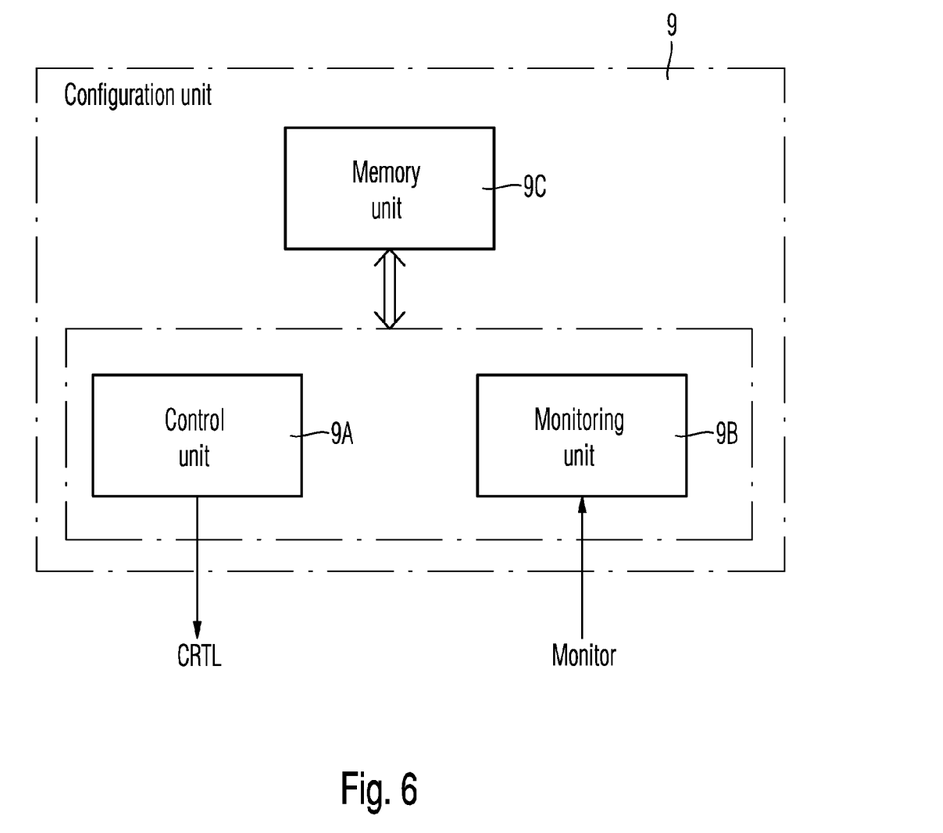
FIG. 6 shows a block diagram of a possible exemplary embodiment of a configuration unit as used in an embodiment of an optical network element according to the present invention.
Figure 8:
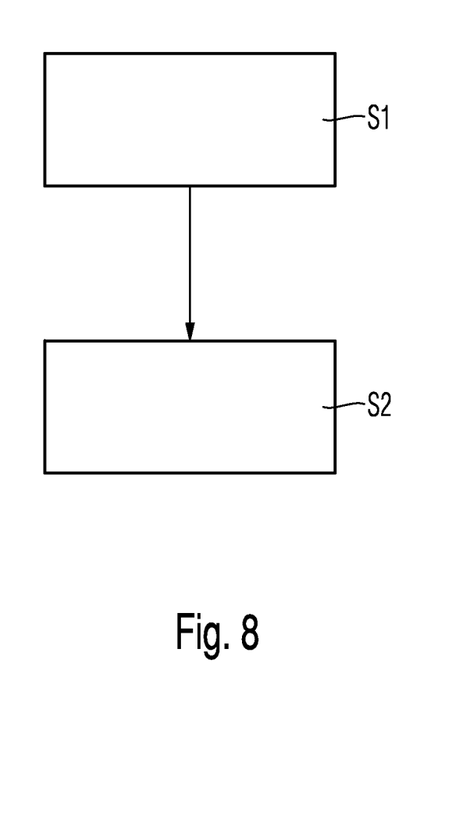
FIG. 8 shows a flowchart for illustrating a possible embodiment of a method for automatic configuration of an optical network element according to the present invention.

FIG. 6 shows a block diagram of a possible embodiment of the configuration unit 9 as employed by the flexible add/drop optical network element 3. In a possible embodiment the configuration unit 9 is integrated in the optical network element 3. In an alternative embodiment the configuration unit 9 is connected to the optical network element 3 via an interface or a signal bus. The configuration unit 9 can also be formed by a remote control unit of the optical network. The configuration unit 9 as shown in FIG. 6 comprises in the shown exemplary embodiment a control unit 9A which controls the optical modules 6, 8 of the optical network element 3 to transmit at least one fibre identifier or label associated with the respective fibre of the optical module. Furthermore, the configuration unit 9 comprises a monitoring unit 9B which monitors fibre identifiers or labels detected by the optical modules 6, 8. In the shown embodiment the control unit 9A and the monitoring unit 9B can be integrated in the same processing unit. Furthermore, the configuration unit 9 can comprise a memory unit 9C for storing the generated connectivity matrix of the optical network element 3. In a possible embodiment the configuration unit 9 can comprise a further interface to read out the generated connectivity matrix stored in the memory unit 9C. The configuration unit 9 can in a possible embodiment execute a configuration program for performing a method for automatic configuration of the optical network element 3 as shown in the flowchart of FIG. 8. The created connectivity matrix stored in the memory 9C can be read out in a possible embodiment via a data interface of said configuration unit 9 for further evaluation.

In a possible embodiment not only an add/drop fibre map or connectivity matrix for a flexible add/drop optical network element 3 is generated by the configuration unit 9 but also a tributary fibre map or tributary fibre connectivity matrix indicating the tributary connection of the add/drop optical network element 3 with transponders/muxponders 4 of any kind. These transponders/muxponders 4 can for example be connected to the interfaces 8B-1, 8B-2 of the switch modules 8-1, 8-2 within the flexible add/drop optical network element 3 as shown in the example of FIG. 5. To generate the tributary connection matrix the transponders 4 can modulate a unique RF/code. In a possible embodiment the transponders 4 can be formed by a pluggable module with a node unique ID. This RF code or ID can be detected along the whole signal path through the network. An amplifier input of a switch module 8-i can detect the RF code of the transponder 4 and from the switch position it can identify the attached switch module number and switch port number. Furthermore, a transponder 4 can identify a received RF code. Based on the add/drop fibre map or connectivity matrix stored in the memory unit 9C of the configuration unit 9 and the switch position it can identify the attached switch module number and switch port number.

The receive side monitoring allows to detect the labels or fibre identifiers of the add/drop modules of the optical network element 3 that are sent downstream to the transponders 4. These labels such as small index frequency modulations can be provided during in-traffic operation and can be detected by the transponders 4 when installed. In addition, or alternatively, an output signal of a transponder 4 can carry a unique label being unique for this transponder 4 which is then detected by the add/drop optical network element 3. The number of the switch card or switch module 8-i and the number of the switch port to which the transponder 4 is connected can be deducted from the detected label and the switch position. When using a multicast switch MCSW a remaining output port (upstream) which is not used for data traffic can collect the inputs of all non commissioned tributary ports. When a new frequency or label occurs one can scan tributary input ports and identify a new signal channel. This allows to freely choose any port to connect to any tributary port or transponder 4 in the add/drop structure. In this embodiment commissioning can be performed automatically.

In a possible embodiment each open port of the fibre shuffle interconnector 7 can be terminated by a multifibre loopback connector 10 to measure loopback losses.

Figure 7:
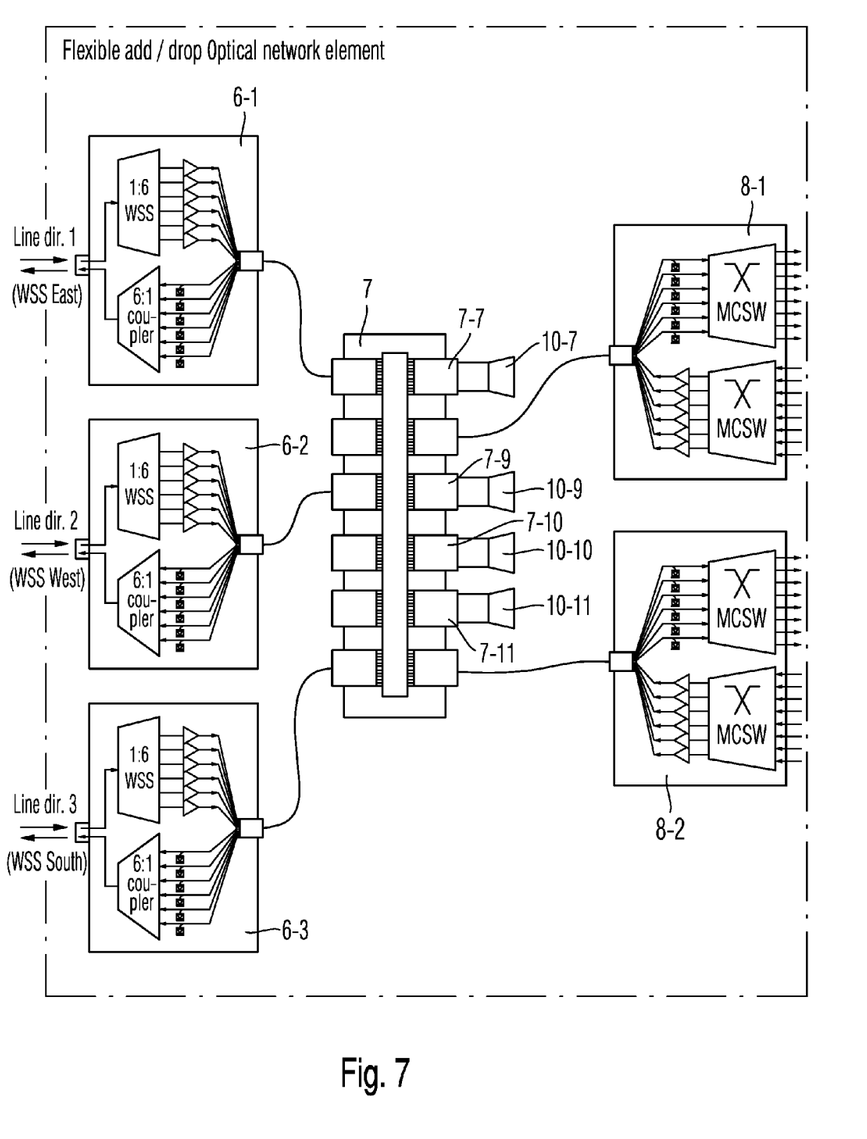
FIG. 7 shows an example illustrating a measurement of through losses and loopback losses performed by an optical network element according to a possible embodiment of the present invention.

In the example shown in FIG. 7 the open downstream ports 7-7, 7-9, 7-10, 7-11 are terminated by corresponding multifibre loopback connectors 10-7, 10-9, 10-100, 10-11.

In a possible embodiment the optical modules 6, 8 of the optical network element 3 as shown in FIG. 7 can comprise for each fibre a signal generator for generating an optical signal having a predetermined signal power and a signal measurement unit for measuring automatically through losses and loopback losses. The signal generation means for generating the optical signal with the predetermined signal power can be the same as the means for generating a fibre identifier or label signal. According to a possible embodiment the predetermined signal power can be the signal power of the label signal or fibre identifier signal. This fibre identifier or label signal can comprise an optical pilot signal or an optical encoded signal. Furthermore, the measuring means for measuring automatically through losses and loopback losses can be formed by the same means as for detecting the fibre identifiers or label signals. In a possible embodiment the output and input power levels are monitored. The multifibre loopback connectors 10 allow a loopback of optical signals on open ports of the fibre shuffle interconnector 7 so that during installation all through and loopback losses can be measured automatically. The loopback is detected automatically by finding the generated received on the same card. In a possible embodiment alarm identifier signals are generated when predetermined loss thresholds are crossed. During installation each connection carries an optical signal of known signal power. In a possible embodiment the signal can be created by an ASE noise of an optical amplifier. On the other end photodiodes, i.e. tap monitors or receiver diodes, measure the received power level to determine the signal through loss. Open multifibre connections can be terminated with a multifibre loopback connector 10 so that also unused connections can be inspected. In order to detect loopbacks ports can obtain a label such as a predetermined frequency or intensity modulation of the optical signal for identification.

FIG. 8 shows a simple flowchart of a possible embodiment of a method for automatic configuration of an optical network element according to the present invention.

The method shown in FIG. 8 is provided for performing an automatic configuration of an optical network element such as the flexible add/drop optical network element 3 comprising optical modules such as fan-out-modules 6 or switch modules 8 each having multiple fibres. Optical modules such as fan-out-modules 6 or switch modules 8 are connected by means of a fibre shuffle interconnector 7.

In a first step S1 for all provided optical modules 6, 8 of the optical network element 3 a fibre identifier or label associated with a fibre of the respective optical module is transmitted to a port of the fibre shuffle interconnector 7 which forwards the received fibre identifier or label via another port to another optical module 6, 8 of the optical network element 3 which detects the forwarded fibre identifier or label.

In a further step S2 a connectivity matrix indicating the connection of the optical modules 6, 8 to that fibre shuffle interconnector 7 is generated automatically on the basis of all detected and monitored fibre identifiers or labels. The method shown in FIG. 8 can be performed in a possible embodiment by a configuration unit 9 such as shown in FIG. 6. This configuration unit 9 can in a possible embodiment be integrated in an optical network element such as the flexible add/drop optical network element 3 shown in FIG. 5. In a possible embodiment the configuration unit 9 can form part of a node controller unit NCU of an apparatus 1 as shown in FIG. 1. The configuration unit 9 creates a fibre map or connectivity matrix out of the association of codes or labels and fibre ports.

This allows a flexible commissioning, i.e. the use of an open port instead of using a specific one similar as provided by an ethernet switch. With the method according to the present invention the internal configuration of the apparatus is done automatically according to the autonomous detected fibre map or connectivity matrix stored in a memory of the configuration unit 9 within the node controller unit NCU of the apparatus 1. Faulty connections such as a fibre connected to the wrong card or a loop configuration can trigger immediately an alarm signal. The method according to the present invention simplifies and accelerates installation and configuration by allowing more flexibility and removing installation rules. Furthermore, an easy upgrade from a single service to an entire node degree is possible. The method allows an automatic commissioning by an automatic detection of the fibre map or connectivity matrix. Furthermore, in a possible embodiment through losses and loopback losses are measured automatically so that dirty surfaces of fibres can be automatically recognized. Multi-fibre cables having for example twelve fibres having therefore twelve fibre surfaces are comparatively difficult to clean so that some of the fibre surfaces can be dirty and can create excessive insertion losses for those fibre connections. Since not all fibres typically carry a signal after installation a dirty connection might stay unrecognized in a conventional apparatus during channel upgrade. An overseen dirty surface on at least one of the twelve fibres can require to break an existing data traffic for one or more of the other eleven fibres in order to clean the connector during a later system upgrade. With the apparatus and method according to an embodiment comprising means for measuring automatically through losses and loopback losses this can be avoided. In a possible embodiment the apparatus 1 as shown in FIG. 1 is provided within a DWDM (Dense Wavelength Division Multiplexing), ROADM (Reconfigurable Optical Add/Drop Multiplexer) device.

The invention claimed is:
1. An optical network element comprising:
optical modules each having multiple fibres;
at least one fibre shuffle interconnector having ports to which said optical modules are connected; and
a configuration unit which performs an automatic configuration of said optical network element by controlling the optical modules connected to said fibre shuffle interconnector to transmit a fibre identifier associated with a fibre of the respective optical module to the respective port of said fibre shuffle interconnector to which said optical module is connected, wherein said fibre shuffle interconnector forwards the received fibre identifier via another port of said fibre shuffle interconnector to another optical module of said optical network element which detects said forwarded fibre identifier being monitored by said configuration unit to generate a connectivity matrix indicating the connection of said optical modules to said fibre shuffle interconnector on the basis of the detected fibre identifiers,
wherein said optical modules comprise a fan-out-module having an interface for connecting the fibres of said fan-out-module to a port of said fibre shuffle interconnector via one or more multifibre cables and an inline interface for connecting the fan-out-module to an optical network interface of a line switch.
2. The optical network element according to claim 1, wherein said configuration unit comprises:
a control unit which controls said optical modules to transmit at least one fibre identifier associated with a fibre of said optical module,
a monitoring unit which monitors fibre identifiers detected by said optical modules and
a memory unit for storing the generated connectivity matrix of said optical network element.
3. The optical network element according to claim 2, wherein the fibre identifier comprises:
an optical pilot signal and/or
an optical encoded signal.
4. The optical network element according to claim 3, wherein said optical modules comprise for each transmitting fibre means for providing a fibre identifier and
for each receiving fibre means for detecting a fibre identifier.
5. The optical network element according to claim 1, wherein said fan-out-module comprises
at least one wave length selective switch (WSS) connected to receiving or transmitting fibres and/or
at least one coupler connected to receiving fibres of said fan-out-module.
6. The optical network element according to claim 5, wherein said ports of said fibre shuffle interconnector are connected to said optical modules by means of multifibre cables comprising MPO cables and MTP cables.
7. The optical network element according to claim 5, wherein an open port of said fibre shuffle interconnector being not connected to an optical module is terminated by a multifibre loopback connector to measure loopback losses.
8. The optical network element according to claim 5, wherein said optical modules comprise for each fibre signal generating means to generate an optical signal having a predetermined signal power for the respective fibre and
signal measuring means to measure automatically through losses and loopback losses.
9. An add-drop-multiplexing device for an optical network comprising at least one flexible add/drop optical network element according to claim 8.
10. A method for automatic configuration of an optical network element comprising optical modules each having multiple fibres,
said optical modules being connected by means of a fibre shuffle interconnector,
wherein said method comprises the steps of:
(a) transmitting for all provided optical modules of said optical network element a fibre identifier associated with a fibre of the respective optical module to a port of said fibre shuffle interconnector which forwards the received fibre identifier via another port to another optical module of said optical network element which detects said forwarded fibre identifier; and
(b) generating a connectivity matrix indicating the connection of said optical modules to said fibre shuffle interconnector on the basis of the detected fibre identifier,
wherein said optical module comprises a fan-out-module having an interface for connecting the fibres of said fan-out-module to a port of said fibre shuffle interconnector via one or more multifibre cables and an inline interface for connecting the fan-out-module to an optical network interface of a line switch.
11. The method according to claim 10,
wherein said method is performed during installation of said optical network element.
12. The method according to claim 10,
wherein said method is performed during an operation of said optical network element.

13. The method according to claim 12,
wherein said fibre identifier comprises
an optical pilot signal; and/or
a specific encoded optical signal.

14. The method according to claim 10, wherein said optical modules are controlled to transmit at least one fibre identifier associated with a fibre of said optical module,
   wherein fibre identifiers detected by said optical modules are monitored, and
   wherein the generated connectivity matrix of said optical network element is stored.

15. The method according to claim 10, wherein the fibre identifier comprises an optical pilot signal and/or an optical encoded signal.

16. The method according to claim 10, wherein said optical modules comprise for each transmitting fibre means for providing a fibre identifier and for each receiving fibre means for detecting a fibre identifier.

\* \* \* \* \*